No. 736,175. PATENTED AUG. 11, 1903.
W. R. USRY.
ATTACHMENT FOR PLOWS OR CULTIVATORS.
APPLICATION FILED MAY 16, 1903.
NO MODEL.
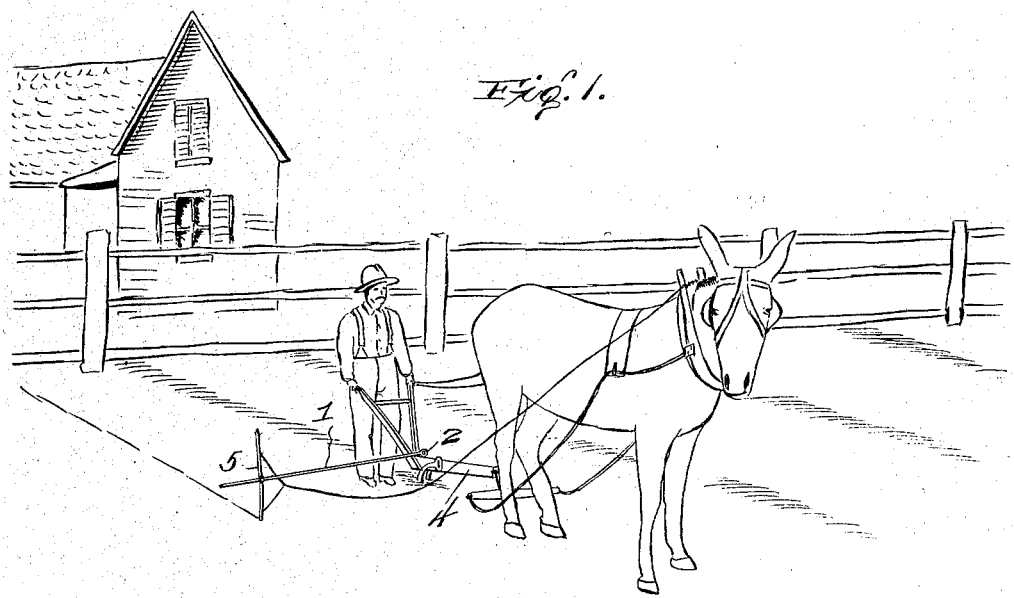
Fig. 1.
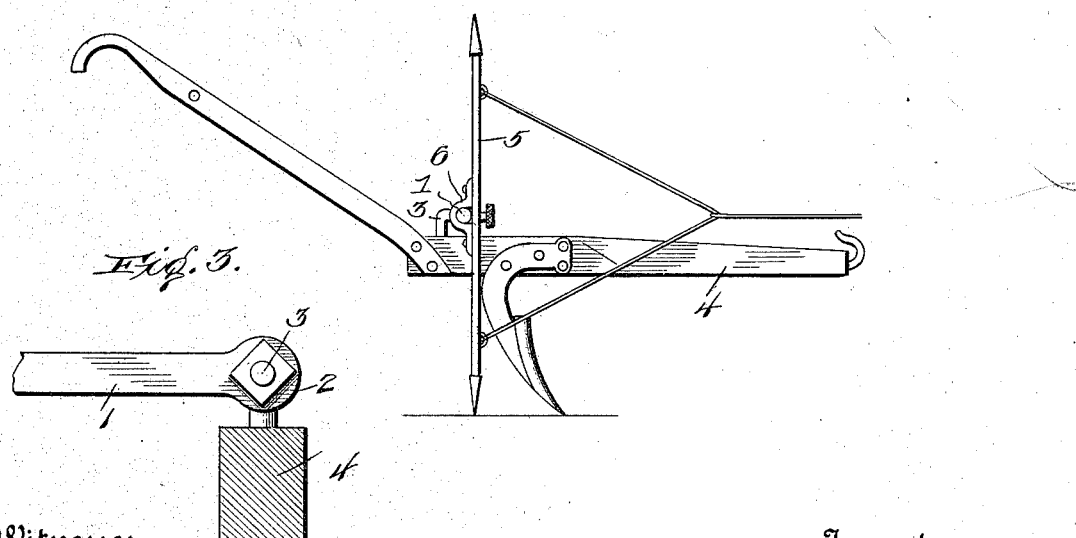
Fig. 2.
Fig. 3.
Witnesses
J. L. Meacham
E. L. Corbett
Inventor:
William R. Usry.
by Edson Bros.
Attorneys No. 736,175. Patented August 11, 1903.

UNITED STATES PATENT OFFICE.

WILLIAM R. USRY, OF GADSDEN, ALABAMA.

ATTACHMENT FOR PLOWS OR CULTIVATORS.

SPECIFICATION forming part of Letters Patent No. 736,175, dated August 11, 1903.

Application filed May 16, 1903. Serial No. 157,418. (No model.)

*To all whom it may concern:*

Be it known that I, WILLIAM R. USRY, a citizen of the United States, residing at Gadsden, in the county of Etowah and State of Alabama, have invented certain new and useful Improvements in Attachments for Plows, Cultivators, &c.; and I do hereby declare the following to be a full, clear, and exact description of the invention, such as will enable others skilled in the art to which it appertains to make and use the same.

My invention relates to attachments for plows or cultivators, more particularly to row-marking devices. It has for its object to provide a device of this character which is reversible and can be adjusted to adapt it for making any desired width between the rows and which at the same time is simple, durable, can be attached to any plow or like implement, and is drawn by a line attached to the harness of the horse or other draft-animal.

In the accompanying drawings, illustrating the preferred embodiment of my invention, Figure 1 is a perspective view of a cultivator, showing my device attached thereto in operation. Fig. 2 is a side view of a cultivator with my device attached, showing the connection of the sliding arm to the hitching-rope and also the adjustable connection of said arm to the carrying-rod. Fig. 3 is a detail view of the pivotal connection of the rod to the cultivator-beam.

Referring more particularly to the drawings, 1 is a rod, preferably made of steel or iron, having at one end an eye 2, adapted to reversibly engage a pin 3, secured to the beam 4 of the plow or like implement, said pin being preferably bent so that the portion engaged by said rod is parallel with the upper surface of said beam. It is evident that a staple may be used in place of this pin; but the advantage of my preferred construction is that the rod may be removably secured by means of a screw engaging a screw-threaded socket in the end of said pin, or the end of the pin may be screw-threaded and said rod retained thereon by a washer and nut, the advantage being that said rod can be removed without withdrawing said pin, as would be necessary if a staple were used. A cross-bar 5, also preferably of steel or iron, is adjustably secured to the rod 1, preferably by means of a metallic loop or staple 6, secured to said cross-rod near its center and embracing said rod, said cross-bar being provided with a set-screw passing through the same intermediate of the two prongs or forks of the staple, whereby said cross-bar can be securely adjusted at any point of said rod. Either one or both ends of the cross-bar may be pointed for marking. To said cross-bar is attached at either side of and preferably at equal distances from the adjusting-staple lines which are equal in length and unite a short distance from said bar in one drawing-line, which is hitched directly to the harness of the horse or other animal, preferably to the top of the hame.

It will be seen that because of the simplicity and lightness of my improved marker it can be reversed by the driver with one hand without releasing the reins from the other; also, being drawn directly by a line attached to the harness all the usual outrigging and side draft are done away with.

I do not confine myself to the details herein shown as an embodiment of my invention, as I am aware that changes may be made—such, for example, as providing the cross-bar with sockets in each end to receive the shank of a tool or marking-point, which may be permanently attached to each end or it may be detachably secured to permit of its transfer from one end to the other of said rod—and I therefore reserve the right to make such changes as fairly fall within the scope of my invention.

Having thus described my invention, what I claim as new, and desire to secure by Letters Patent, is—

1. An attachment of the character described, comprising a rod pivoted at one end to a machine, a cross-bar connected near its center to said rod and adjustable thereon, and means for flexibly connecting the free end of said rod and the frame of the machine to a common motor, substantially as set forth.

2. An attachment of the character described, comprising a rod connected at one end to a machine, a cross-bar connected near its center to said rod and adjustable thereon, said cross-bar having connected thereto a draw-line adapted to be attached to the harness of the draft-animal and to form a slack when the animal is at rest.

3. An attachment of the character described, comprising a rod having an eye at one end engaging a right-angled pin on the beam of a machine, a cross-bar connected near its center to said rod and having flexible connection with the motor, means for adjusting said cross-bar at any desired point upon said rod comprising a loop secured to said cross-bar and carrying a set-screw, said loop embracing said rod and adapted to be made to grasp the same by operating said set-screw.

In testimony whereof I affix my signature in presence of two witnesses.

WILLIAM R. USRY.

Witnesses:
M. L. HEATH,
H. B. MYERS.